United States Patent
Ji et al.

(10) Patent No.: US 12,153,005 B2
(45) Date of Patent: Nov. 26, 2024

(54) LIQUID METAL HIGH-TEMPERATURE OSCILLATING HEAT PIPE AND TESTING METHOD

(71) Applicant: DALIAN MARITIME UNIVERSITY, Liaoning (CN)

(72) Inventors: Yulong Ji, Liaoning (CN); Mengke Wu, Liaoning (CN); Xiu Xiao, Liaoning (CN); Yantao Li, Liaoning (CN); Chunrong Yu, Liaoning (CN); Yuqing Sun, Liaoning (CN)

(73) Assignee: DALIAN MARITIME UNIVERSITY, Liaoning (CN)

( * ) Notice: Subject to any disclaimer, the term of this patent is extended or adjusted under 35 U.S.C. 154(b) by 261 days.

(21) Appl. No.: 17/631,262

(22) PCT Filed: Jun. 29, 2020

(86) PCT No.: PCT/CN2020/098716
§ 371 (c)(1),
(2) Date: Jan. 28, 2022

(87) PCT Pub. No.: WO2021/031699
PCT Pub. Date: Feb. 25, 2021

(65) Prior Publication Data
US 2022/0299458 A1    Sep. 22, 2022

(30) Foreign Application Priority Data

Aug. 20, 2019  (CN) ......................... 201910770503.X
Aug. 20, 2019  (CN) ......................... 201921354543.8

(51) Int. Cl.
*G01N 25/18*    (2006.01)
*F28D 15/02*    (2006.01)
(Continued)

(52) U.S. Cl.
CPC ............. *G01N 25/20* (2013.01); *F28D 15/02* (2013.01); *F28D 15/04* (2013.01); *G01N 25/18* (2013.01); *F28F 2200/005* (2013.01)

(58) Field of Classification Search
CPC ........ G01N 25/20; G01N 25/18; F28D 15/02; F28D 15/04; F28D 15/0266;
(Continued)

(56) References Cited

U.S. PATENT DOCUMENTS 3,794,566 A * 2/1974 Raal ........................ G01N 25/14
                                                      202/202
4,617,985 A * 10/1986 Triggs ................... F28D 15/046
                                                       165/47

(Continued)

FOREIGN PATENT DOCUMENTS

CN         102183164 A  *  9/2011    ......... F28D 15/0266
CN         103001533 A  *  3/2013    ......... F28D 15/0266
(Continued)

OTHER PUBLICATIONS

U.S. Appl. No. 17/631,262, filed Apr. 15, 2024_CN_102183164_A_H.pdf,Sep. 14, 2011.*
(Continued)

*Primary Examiner* — Gail Kaplan Verbitsky
(74) *Attorney, Agent, or Firm* — NKL Law; Allen Xue

(57) ABSTRACT

A liquid metal high-temperature oscillating heat pipe and a testing system are provided. The testing system contains the high-temperature oscillating heat pipe, a high-temperature heating furnace, a cooling liquid block, a high-pressure pump, a constant temperature liquid bath, a mass flowmeter, a filter, a cooling liquid valve, and a measurement and control connected to the aforementioned devices. The constant temperature liquid bath, the high-pressure pump, the filter, the cooling liquid valve, a liquid filling port tee- (Continued)

junction, the cooling liquid block, a liquid outlet tee-junction, and the mass flowmeter are connected in sequence and the mass flowmeter is connected to the constant temperature liquid bath. The front side of the cooling liquid block is provided with a channel connected to a condenser of the high-temperature oscillating heat pipe. The adiabatic section of the high-temperature oscillating heat pipe being connected to the high-temperature heating furnace.

10 Claims, 11 Drawing Sheets

(51) Int. Cl.
   *F28D 15/04* (2006.01)
   *G01N 25/20* (2006.01)
(58) Field of Classification Search
   CPC ...... F28D 15/043; F28D 15/06; F28D 15/046;
           F28D 15/0233; F28D 20/0056; F28D
           2020/0078; F28D 2021/0029; F28D
           15/0241; F28D 15/025; F28D 15/0275;
           F28D 15/0283; F28F 2200/005
   See application file for complete search history.

(56) References Cited

U.S. PATENT DOCUMENTS

| | | | |
|---|---|---|---|
| 8,641,271 B2 | 2/2014 | Wang et al. | |
| 2001/0023757 A1* | 9/2001 | Huang | F28D 15/043 |
| | | | 165/104.33 |
| 2006/0032379 A1* | 2/2006 | Kates | G05D 23/1917 |
| | | | 96/417 |
| 2006/0144567 A1* | 7/2006 | Zhu | F28D 15/0275 |
| | | | 257/E23.088 |
| 2006/0146496 A1* | 7/2006 | Asfia | H05K 7/20672 |
| | | | 361/700 |
| 2009/0101308 A1* | 4/2009 | Hardesty | F28D 15/0266 |
| | | | 165/80.4 |
| 2011/0277967 A1* | 11/2011 | Fried | F28D 15/0266 |
| | | | 165/104.26 |
| 2017/0141654 A1* | 5/2017 | Bodla | H02K 9/225 |
| 2018/0158756 A1* | 6/2018 | Smoot | H01L 21/4871 |
| 2024/0234867 A1* | 7/2024 | Cheng | H01M 10/6567 |

FOREIGN PATENT DOCUMENTS

| | | | | |
|---|---|---|---|---|
| CN | 104634147 A | * | 5/2015 | ......... F28D 15/0266 |
| CN | 104748595 A | * | 7/2015 | |
| CN | 204514143 U | * | 7/2015 | ......... F28D 15/0266 |
| CN | 104848718 A | | 8/2015 | |
| CN | 107436106 A | * | 12/2017 | ......... F28D 15/0283 |
| CN | 109269710 A | | 1/2019 | |
| CN | 110133038 A | * | 8/2019 | |
| CN | 110470161 A | | 11/2019 | |
| CN | 210604474 U | | 5/2020 | |
| EP | 4321961 A1 | * | 2/2024 | ......... F28D 15/0233 |
| EP | 4343260 A2 | * | 3/2024 | ......... F28D 15/0233 |
| KR | 20220002653 A | * | 1/2022 | |

OTHER PUBLICATIONS

U.S. Appl. No. 17/631,262, filed Apr. 15, 2024_CN_104634147_A_H.pdf,May 20, 2015.*
U.S. Appl. No. 17/631,262, filed Apr. 15, 2024_CN_104748595_A_H.pdf,Jul. 1, 2015.*
U.S. Appl. No. 17/631,262, filed Apr. 15, 2024_CN_110133038_A_H.pdf,Aug. 16, 2019.*
U.S. Appl. No. 17/631,262, filed Apr. 15, 2024_EP_4321961_A1_H.pdf,Feb. 14, 2024.*
U.S. Appl. No. 17/631,262, filed Apr. 15, 2024_EP_4343260_A2_H.pdf,Mar. 27, 2024.*
U.S. Appl. No. 17/631,262, filed Apr. 15, 2024_CN_103001533_A_H.pdf,Mar. 27, 2013.*
U.S. Appl. No. 17/631,262, filed Apr. 15, 2024_CN_204514143_U_H.pdf,Jul. 29, 2015.*
U.S. Appl. No. 17/631,262, filed Jul. 15, 2024_CN_107436106_A_H.pdf,Dec. 5, 2017.*
U.S. Appl. No. 17/631,262, filed Jul. 15, 2024_CN_110133038_A_H.pdf,Aug. 16, 2019.*

* cited by examiner

LIQUID METAL HIGH-TEMPERATURE OSCILLATING HEAT PIPE AND TESTING METHOD

TECHNICAL FIELD

The present disclosure relates to the technical field of the oscillating heat pipe researches, in particular to a liquid metal high-temperature oscillating heat pipe and a testing method.

BACKGROUND

Oscillating heat pipe (OHP) is a new efficient heat transfer device that can be used in tiny space under high heat flux conditions, proposed by Akachi in the early 1990s. An oscillating heat pipe consists of curved capillary tubes, which is filled with appropriate amount of working fluid after evacuated. During working, the working fluid absorbs heat and gas pressure increases in the evaporator, and then flows to the low-temperature condenser where the liquid plugs shrink and break. Due to the pressure difference between the two ends and the pressure imbalance between the adjacent tubes, the working fluid oscillates between the evaporator and the condenser, so as to achieve heat transfer.

Generally, the oscillating heat pipe whose working temperature exceeds 500° C. is called the high-temperature oscillating heat pipe. At present, the working temperatures of oscillating heat pipes in productions and researches are mostly less than 200° C., which restricts the application of oscillating heat pipes in high-temperature heat transfer fields such as aeronautics and astronautics. Therefore, it is of great significance to develop an oscillating heat pipe that can work stably for a long time at high temperature environments.

In order to guide engineering application and master the law of heat transfer performance of the high-temperature oscillating heat pipe, and further design a high-temperature oscillating heat pipe suitable for different working conditions, it is necessary to study the heat transfer performance of the high-temperature oscillating heat pipe. During the study, it is necessary to ensure the accuracy and reliability of testing data. However, the existing testing methods of oscillating heat pipes can only meet the testing requirements of the medium and low temperature environments, cannot meet the testing requirements in high-temperature environments. Therefore, it is of great significance to build a new-type of high-temperature oscillating heat pipe testing system.

SUMMARY OF THE INVENTION

According to the above-mentioned technical problems that the oscillating heat pipe in the prior art cannot work stably for a long time under high temperature environments, and the existing oscillating heat pipe testing method cannot meet the testing requirements of the high temperature environments, the present disclosure provides a liquid metal high-temperature oscillating heat pipe and a testing method. The test system provided by the invention provides the high temperature oscillating heat pipe with test conditions in high temperature environments, measures and calculates the heat taken away by the high-temperature oscillating heat pipe through the cooling liquid, and measures and calculates the heat leakage at the same time, which can more accurately measure the heat transfer of the high-temperature oscillating heat pipe, thereby more accurately evaluate the heat transfer performance of the high-temperature oscillating heat pipe.

The technical solutions adopted by the present disclosure are as follows:

A liquid metal high-temperature oscillating heat pipe includes a tee junction liquid filling port and a stainless steel tube array integrated by an evaporator, an adiabatic section and a condenser. Two ports in a horizontal direction of the tee junction liquid filling port are connected to the two ports of the stainless steel tube array; the working fluid in the stainless steel tube array is liquid metal which has higher latent heat of vaporization at high temperature environments. The liquid metal is at least one of sodium-potassium alloy, sodium metal, potassium metal, cesium metal and rubidium metal, wherein the mass fraction of potassium in the sodium-potassium alloy ranges from 25% to 75%. The liquid metal has the characteristic of being liquid at room temperature, which can remove the melting process in the heating process, make the start-up of the high-temperature oscillating heat pipe more simple, improve the start-up performance of the high-temperature oscillating heat pipe, and reduce the difficulty of filling process.

Further, the filling ratio of the high-temperature oscillating heat pipe ranges from 10% to 90%.

Further, the shell tube of the high-temperature oscillating heat pipe is at least one of stainless steel, nickel base alloy and Inconel nickel base alloy. The aforesaid shell tube materials have the characteristics of high-temperature and corrosion resistance, and have good compatibility with the working fluid at high temperature environments, at the same time, the aforesaid shell tube materials have stable performance in the working temperature zone of the high-temperature oscillating heat pipe, which can ensure the long time stable operation of the high-temperature oscillating heat pipe in the high temperature environments. The wall thickness of the high-temperature ranges from 0.5 to 3 mm, and the inner diameter conforms to the following equation:

$$D_e < D = \left\{ \frac{4 p_g q}{u \pi h_c \left[ \frac{\Phi}{\varphi} \rho_{L,0} - \rho_{L,av} \right]} \right\}^{\frac{1}{2}};$$

wherein, $D_e$ represents the inner diameter of the high-temperature oscillating heat pipe, with the unit of m; D represents the start-up critical tube diameter of the oscillating heat pipe, with the unit of m; $\Phi$ represents the filling ratio, with a unit of %; $\varphi$ represents the percentage of the liquid to the total pipe volume after applying input power, with a unit of %; $\rho_{L,0}$ represents the liquid density at an operating temperature before applying input power, with a unit of kg/m³; $\rho_{L,av}$ represents the average density of the liquid working fluid after applying input power, with a unit of kg/m³; u represents the rising speed of a bubble relative to the liquid, with a unit of m/s; $h_c$ represents latent heat of vaporization of the working fluid at a cold end temperature, with a unit of J/kg; q represents input power, with a unit of J/s; and $p_g$ represents the latent heat ratio, with a unit of %.

The present disclosure also provides a testing method for the liquid metal high-temperature oscillating heat pipe, for measuring heat transfer performance of the high-temperature oscillating heat pipe, wherein the test method is measured by the following test system, including a high-temperature heating furnace which connects to the high-temperature oscillating heat pipe, a cooling liquid block, a high-pressure pump, a constant temperature liquid bath, a mass flowmeter, a filter, a cooling liquid valve and a measurement and control system in signal connection with the aforementioned devices.

The constant temperature liquid bath is connected with one side of the high-pressure pump, the other side of the high-pressure pump is connected with one side of the filter; the other side of the filter is connected with one side of the cooling liquid valve; the other side of the cooling liquid valve is connected with one side of the cooling liquid block through the liquid inlet tee-junction; the other side of the cooling liquid block is connected with one side of the mass flowmeter through the liquid outlet tee-junction; the other side of the mass flowmeter is connected with the constant temperature liquid bath; and all the aforementioned devices form a circular connection loop; the cooling liquid discharged from the constant temperature liquid bath flows counterclockwise and finally flows back to the constant temperature liquid bath, and the cooling liquid achieves circular flow through the high-pressure pump. The outer front side of the cooling liquid block is provided with channels matched with the outer diameter size of the high-temperature oscillating heat pipe, and the channels are connected with the condenser of the high-temperature oscillating heat pipe, and the adiabatic section of the high-temperature oscillating heat pipe is connected with the high-temperature heating furnace, and the evaporator of the high-temperature oscillating heat pipe is placed in the high-temperature heating furnace. Multi-layer channels are arranged inside the cooling liquid block, and the forced convection flow of the cooling liquid in the channels transfers the heat of the condenser of the high-temperature oscillating heat pipe to the cooling liquid, thereby realize the cooling of the high-temperature oscillating heat pipe. The filter is used to filter the impurities in the cooling liquid to protect the mass flowmeter. The mass flowmeter is used for measuring the flow of cooling liquid. The cooling liquid valve is used for regulating the flow of cooling liquid. The constant liquid bath is used to maintain the constant temperature of the discharged cooling liquid. The temperature and flow of the cooling liquid can be controlled by setting the parameters of the constant liquid bath, the high-pressure pump and the cooling liquid valve.

The testing method is as follows: starting the high-pressure pump to start the circulation of the cooling liquid, adjusting cooling liquid flow by adjusting the opening of the cooling liquid valve and reading mass flowmeter data, filtering the cooling liquid by the filter to remove impurities; starting the constant temperature liquid bath to adjust the cooling liquid temperature, to provide stable cooling environments for the high-temperature oscillating heat pipe; adjusting the high-temperature heating furnace to a low-power heating state for warming-up; during the warming-up process, debugging thermocouples, RTD (resistance temperature detector) temperature sensors and the measurement and control system to ensure the accuracy of data; controlling and adjusting heating temperature, heating speed, input power and inclination angle of the high-temperature oscillating heat pipe by adjusting parameters setting of the high-temperature heating furnace; setting multi-stage heating process parameters by adjusting a heating program of the high-temperature heating furnace, adjusting the heating speed and target temperature of the furnace and keeping warm, and ensuring constant input power of the high-temperature oscillating heat pipe after stable operation, and recording testing data; closing the high-temperature heating furnace, turning down the temperature of the constant temperature liquid bath into a cooling process, and the test being ended once the cooling process ended.

Further, a temperature range of the cooling liquid discharged from the constant temperature liquid bath ranges from 5° C. to 300° C.

Further, the periphery of the high-temperature oscillating heat pipe and the cooling liquid block is overall wrapped with an thermal insulation layer to ensure that the heat of the condenser of the high-temperature oscillating heat pipe is transferred to the cooling liquid and the heat transferred by the high-temperature oscillating heat pipe can be accurately measured; the material of the thermal insulation layer is a high-temperature resistance thermal insulation material, and at least four thermocouples are set inside and outside the thermal insulation layer to measure the average temperature of the inner and outer walls of the thermal insulation layer to calculate heat leakage.

Further, the liquid inlet tee-junction and the liquid outlet tee-junction are both connected with the RTD temperature sensors inserting into the central position of cooling liquid pipeline.

Further, the high-temperature furnace is a sealed box structure and is used to heat the high-temperature oscillating heat pipe. The top of the furnace is provided with an upper cover of furnace chamber having a stepped hole. The high-temperature oscillating heat pipe inserts into the high-temperature heating furnace through the through-hole in the middle of the stepped hole, and the adiabatic section is wrapped with high-temperature resistance thermal insulation material and is vertically installed in the through-hole of the upper cover. The upper cover of furnace chamber is arranged on the top of the high-temperature heating furnace. Heating rods can be installed on the front, rear, left and right sides of the high-temperature heating furnace, to heat the high-temperature oscillating heat pipe evenly. There is aside gap between the stepped hole and the vertically installed high-temperature oscillating heat pipe, which is sealed by filling high-temperature resistance thermal insulation material. By machining stepped hole and filling the thermal insulation material, the thermal insulation material can be fixed more stable and avoid falling of the thermal insulation material caused by the vertical hole. A flange plate is welded at the central position of both sides of the body of the high-temperature heating furnace and an angle adjusting device composed of gear transmission mechanisms is installed on the flange plate to adjust the overall inclination angle of the high-temperature heating furnace, thereby adjust the inclination angle of the high-temperature oscillating heat pipe, wherein the inclination angle ranges from 0 to 180°. The heating temperature, heating speed, input power and inclination angle of the high-temperature oscillating heat pipe can be controlled and adjusted by adjusting the parameter setting of the high-temperature heating furnace. By adjusting the heating program of the high-temperature heating furnace, the multi-stage heating process parameters can be set, the heating speed and target temperature can be adjusted and keep the temperature, and the input power can keep constant when the high-temperature oscillating heat pipe working stably.

Further, the evaporator, adiabatic section and condenser of the high-temperature oscillating heat pipe are respectively provided with at least one thermocouple, and a transverse tube at the upper section of the condenser of the high-temperature oscillating heat pipe is provided with at least one thermocouple. The thermocouples provided on the high-temperature oscillating heat pipe are used to detect the temperature changes of the evaporator, adiabatic section and condenser, get temperature curves and thermal resistance of the high-temperature oscillating heat pipe, thereby study the heat transfer performance of the high-temperature oscillating heat pipe. The temperatures of the evaporator and the condenser can be measured by the thermocouple readings, and the average temperatures of the evaporator and the condenser can be calculated by averaging the readings of a plurality of thermocouples.

Further, the thermal resistance of the high-temperature oscillating heat pipe conforms to the following equation:

$$R = \frac{\overline{T}_e - \overline{T}_c}{Q_e};$$

wherein, R represents the thermal resistance of the high-temperature oscillating heat pipe, with a unit of K/W; $\overline{T}_e$ represents an average temperature of the evaporator during stable operation of the high-temperature oscillating heat pipe, with a unit of ° C.; $\overline{T}_c$ represents an average temperature of the condenser during stable operation of the high-temperature oscillating heat pipe, with a unit of ° C.; and $Q_e$ represents the input power of the high-temperature oscillating heat pipe, with a unit of W.

The input power of the high-temperature oscillating heat pipe conforms to the following equation:

$$Q_e = C_p q_m \Delta T + q;$$

$$\Delta T = T_1 - T_2;$$

wherein, $Q_e$ represents the input power of the high-temperature oscillating heat pipe, with a unit of W; q represents the heat leakage, with a unit of W; $q_m$ represents a mass flow of cooling water measured by the mass flowmeter, with a unit of kg/s; $T_1$ represents the measured temperature of the RTD temperature sensor at the liquid outlet tee-junction, with a unit of ° C.; $T_2$ represents the measured temperature of the RTD temperature sensor at the liquid inlet tee-junction, with a unit of ° C.; $\Delta T$ represents a temperature difference at the liquid inlet and outlet, with a unit of ° C.; $C_p$ represents a specific heat capacity of the cooling water at the operating temperature, with a unit of J/(kg·K).

The heat leakage conforms to the following equation:

$$q = \frac{kA\Delta T_l}{L};$$

wherein, q represents the heat leakage, with a unit of W; k is a thermal conductivity of the thermal insulation layer material, with a unit of W/(m·k); A represents an area of the thermal insulation layer, with a unit of m²; $\Delta T_l$ represents a temperature difference between inside and outside the thermal insulation layer, with a unit of ° C.; and L represents a thickness of the thermal insulation layer, with a unit of m.

Compared with the prior art, the present disclosure has the following advantages:

1. The liquid metal high-temperature oscillating heat pipe and the testing method disclosed in the present disclosure, can meet the testing requirements for the high-temperature oscillating heat pipe in the high temperature environments, and the designed high-temperature oscillating heat pipe can work stably for a long time in the high temperature environments of more than 500° C.

2. The liquid metal high-temperature oscillating heat pipe and the testing method disclosed in the present disclosure, the cooling liquid pipeline of the testing system is provided with two RTD temperature sensors, a filter and a mass flowmeter with high precision. The RTD temperature sensors can be inserted into the upper ports of the inlet and outlet tee-junctions to measure the temperature of the inlet and outlet of the cooling liquid to obtain the temperature difference between the inlet and outlet of the cooling liquid. The filter can filter the impurities in the cooling liquid, which can protect the mass flowmeter and ensure the flow stability at the same time. The mass flowmeter measures the flow. The heat transferred by the high-temperature oscillating heat pipe can be calculated through the above data.

3. The liquid metal high-temperature oscillating heat pipe and the testing method disclosed in the present disclosure, by arranging a plurality of thermocouples inside and outside the thermal insulation layer wrapped the condenser of the high-temperature oscillating heat pipe, the temperature of the inner and outer walls of the thermal insulation layer can be measured to calculate the heat leakage.

4. The liquid metal high-temperature oscillating heat pipe and the testing method disclosed in the present disclosure, adopts the cooling liquid system to measure and calculate the heat carried by the high-temperature oscillating heat pipe through the cooling liquid, and measure and calculate the heat leakage at the same time, which can more accurately measure the quantity of heat transmitted by the high-temperature oscillating heat pipe and more accurately evaluate the heat transfer performance of the high-temperature oscillating heat pipe.

In conclusion, the application of the technical solution of the present disclosure can solve the problems existing in the prior art that the oscillating heat pipe is difficult to work stably for a long time at a high temperature and the existing oscillating heat pipe testing methods cannot meet the testing requirements in high temperature environments.

Based on the above reasons, the present disclosure can be can be widely popularized in the fields of aeronautics and astronautics where heat pipes are used for high temperature heat transfer

DETAILED DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

1. thermocouple No. 1; 2. thermocouple No. 2; 3. thermocouple No. 3; 4. thermocouple No. 4; 5. thermocouple No. 5; 6. thermocouple No. 6; 7. thermocouple No. 7; 8. thermocouple No. 8; 9. thermocouple No. 9; 10. thermocouple No. 10; 11. thermocouple No. 11; 12. thermocouple No. 12; 13. thermocouple No. 13; 14. thermocouple No. 14; 15. thermocouple No. 15; 16. thermocouple No. 16; 17. thermocouple No. 17; 18. thermocouple No. 18; 19. thermocouple No. 19; 20. high-temperature heating furnace; 21. high-temperature oscillating heat pipe; 22. cooling liquid block; 23. liquid inlet tee-junction; 24. liquid outlet tee-junction; 25. mass flowmeter; 26. constant temperature liquid bath; 27. high-pressure pump; 28. filter; 29. cooling liquid valve; 30. tee-junction liquid filling port; 31. stainless steel array; 32. condenser; 33. adiabatic section; 34. evaporator; 35. stepped hole.

DETAILED DESCRIPTION OF PREFERRED EMBODIMENTS

It should be noted that, in the case of no conflicts, the embodiments and the features in the embodiments of the present disclosure can be combined mutually. The present disclosure will be described in detail below with reference to the accompanying drawings and the embodiments.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those of ordinary skill in the art without inventive effort are within the protection scope of the present disclosure.

Embodiment 1

Figure 1:
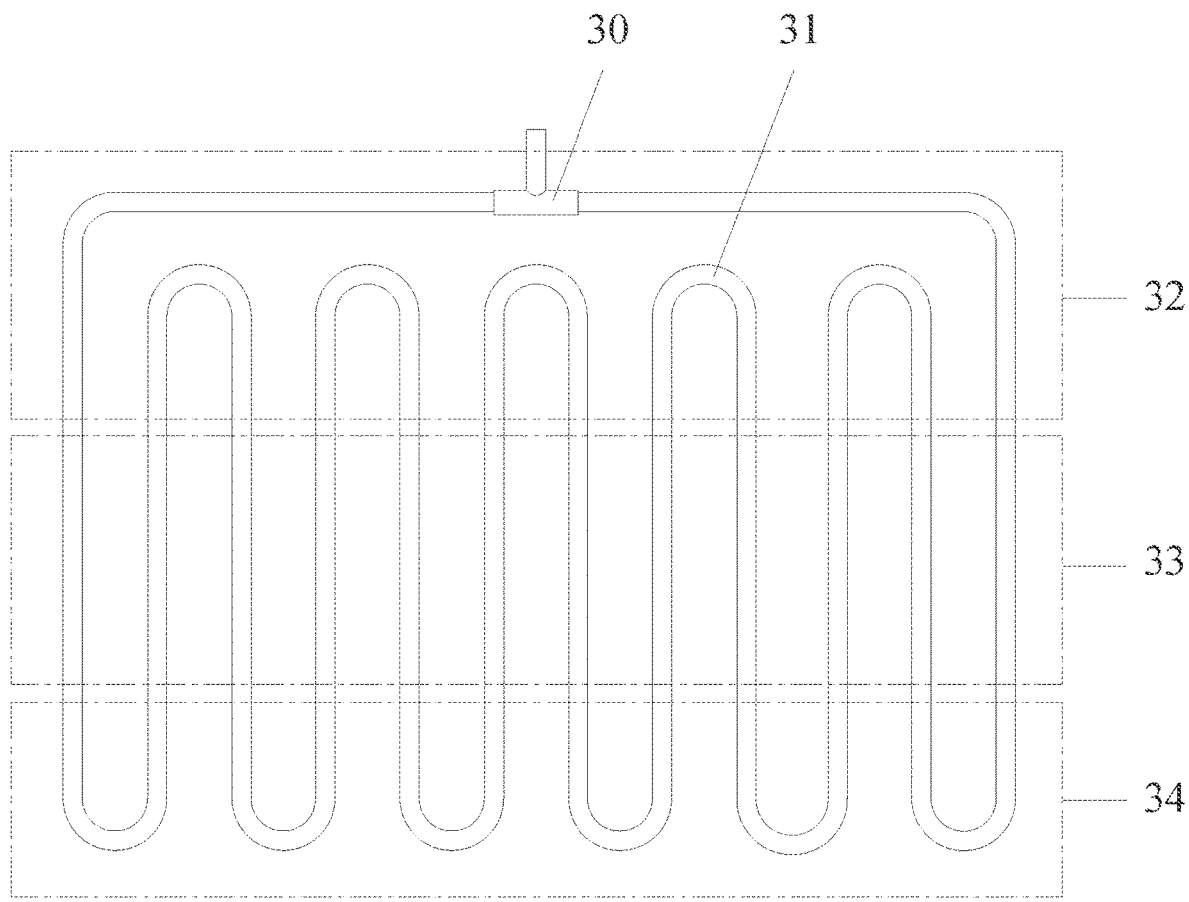
FIG. 1 is a schematic diagram of the high-temperature oscillating heat pipe of the present disclosure.

As shown in FIG. 1, the present disclosure discloses a liquid metal high-temperature oscillating heat pipe, including a tee-junction liquid filling port 30 and a stainless steel tube array 31 integrated by a evaporator 34, an adiabatic section 33 and a condenser 32. The two ports in a horizontal direction of the tee-junction liquid filling port are weld connected to the two ports of the stainless steel tube array 31. The stainless steel tube array 31 is filled with liquid metal, which has a high latent heat of vaporization at high temperature environments, as working fluid. The liquid metal is sodium-potassium alloy, and the mass fraction of potassium in the sodium-potassium alloy ranges from 25% to 75%. The sodium-potassium alloy has the characteristic of being liquid at room temperature, which can remove the melting process in the heating process, make the start-up of the high-temperature oscillating heat pipe 21 more simple and improve the start-up performance of the high-temperature oscillating heat pipe 21 and reduce the difficulty of filling process.

In the embodiment, the filling ratio of the high-temperature oscillating heat pipe 21 ranges from 10% to 90%.

In the embodiment, the shell tube of the high-temperature oscillating heat pipe 21 is stainless steel 310s, having the characteristics of high-temperature resistance and corrosion resistance and having good compatibility with the working fluid at high temperature environments. The stainless steel 310s has stable performance in the working temperature zone of the high-temperature oscillating heat pipe 21, which can ensure the long time stable operation of the high-temperature oscillating heat pipe 21 in the high-temperature environments. In the embodiment, the wall thickness of the high-temperature oscillating heat pipe 21 ranges from 0.5 to 3 mm, and an inner diameter conforms to the following equation:

$$D_e < D = \left\{ \frac{4p_g q}{u\pi h_c \left[ \frac{\Phi}{\varphi} \rho_{L,0} - \rho_{L,av} \right]} \right\}^{\frac{1}{2}};$$

wherein, De represents the inner diameter of the high-temperature oscillating heat pipe, with the unit of m; D represents the start-up critical tube diameter of the oscillating heat pipe, with the unit of m; $\Phi$ represents the filling ratio, with the unit of %; $\varphi$ represents the percentage of the liquid to the total pipe volume after applying input power, with the unit of %; $\rho_{L,0}$ represents the liquid density at an operating temperature before applying input power, with the unit of kg/m³; $\rho_{L,av}$ represents the average density of the liquid working fluid after adding heat, with the unit of kg/m³; u represents the rising speed of a bubble relative to the liquid, with the unit of m/s; $h_c$ represents latent heat of vaporization of the working fluid at a cold end temperature, with the unit of J/kg; q represents input power, with the unit of J/s; and $p_g$ represents the latent heat ratio, with the unit of %.

Embodiment 2

Figure 2:
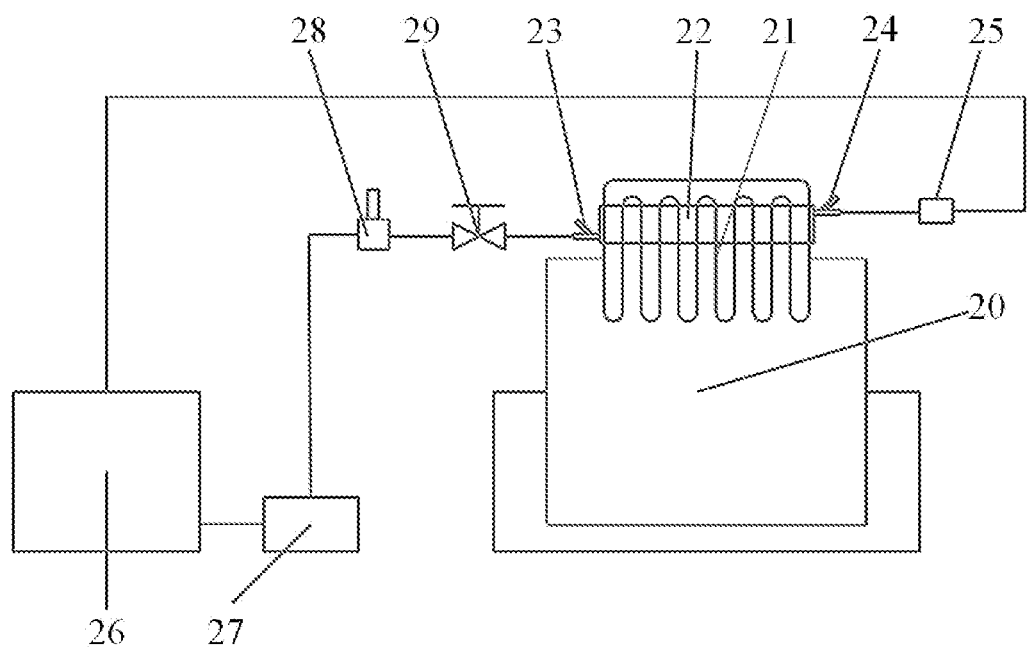
FIG. 2 is a schematic diagram of the testing system of the present disclosure.
Figure 3:
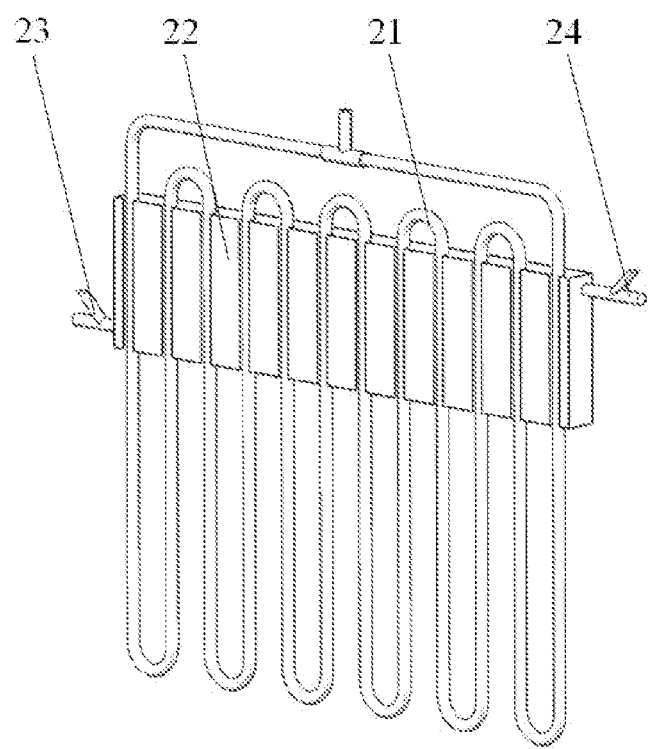
FIG. 3 is a schematic diagram of the high-temperature oscillating heat pipe and the cooling liquid block of the present disclosure.
Figure 4:
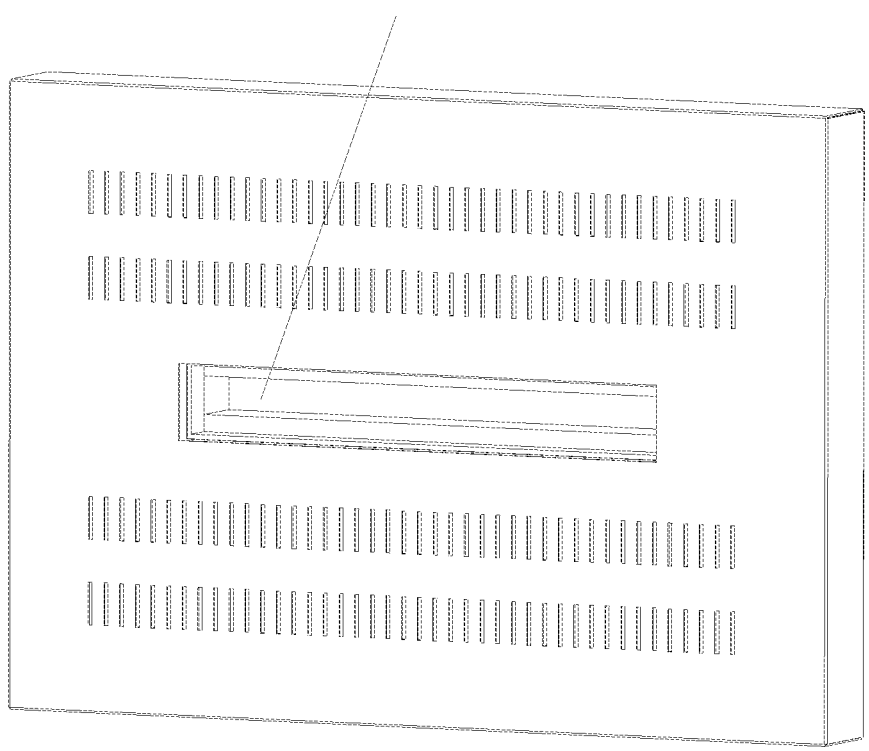
FIG. 4 is a schematic diagram of the upper cover of furnace chamber of the high-temperature heating furnace of the present disclosure.

Based on embodiment 1, as shown in FIGS. 2 to 4, the present disclosure also provides a testing method for the liquid metal high-temperature oscillating heat pipe, for measuring heat transfer performance of the liquid metal high-temperature oscillating heat pipe. The testing method is to measure by means of a testing system. The said testing system includes a high-temperature heating furnace 20 connected to the high-temperature oscillating heat pipe 21, a cooling liquid block 22, a high-pressure pump 27, a constant temperature liquid bath 26, a mass flowmeter 25, a filler 28, a cooling liquid valve 29 and a measurement and control system in signal connection with the aforementioned devices.

The right side of the constant temperature liquid bath 26 is connected with the left side of the high-pressure pump 27 through a pipeline. The water outlet of the high-pressure pump 27 is connected with the left side of the filter 28 through a pipeline. The right side of the filter 28 is connected with the left side of the cooling liquid valve 29 through a pipeline. The right side of the cooling liquid valve 29 is connected with the left side of the cooling liquid block 22 through a pipeline and the liquid inlet tee junction 23. The right side of the cooling liquid block 22 is connected with the left side of the mass flowmeter 25 through the liquid outlet tee-junction 24 and a pipeline. The right side of the mass flowmeter 25 is connected with the constant temperature liquid bath 26. All the aforementioned devices form a circular connection loop. The cooling liquid discharged from the constant temperature liquid bath 26 flows counterclockwise and finally back to the constant temperature liquid bath 26, and the cooling liquid achieves circular flow through the high-pressure pump 27. The outer front side of the cooling liquid block 22 is provided with channels matched with the outer diameter size of the high-temperature oscillating heat pipe 21, and the condenser 32 of the high-temperature oscillating heat pipe 21 is embedded in the channels. The adiabatic section 33 at the middle of the high-temperature oscillating heat pipe 21 is connected with the high-temperature heating furnace 20, and the evaporator 34 of the high-temperature oscillating heat pipe 21 inserts into the high-temperature heating furnace 20. By adjusting the height of the cooling liquid block 22 and the length of the high-temperature oscillating heat pipe 21 inserting into the high-temperature heating furnace 20, the installation lengths of the evaporator 34, adiabatic section 33 and condenser 32 are adjusted. Multi-layer channels are arranged inside the cooling liquid block 22, and the forced convection flow of the cooling liquid in the channels transfers the heat of the condenser 32 of the high-temperature oscillating heat pipe 21 to the cooling liquid, thereby cools the high-temperature oscillating heat pipe 21. The filter 28 is used to filter the impurities in the cooling liquid and protect the mass flowmeter 25. The mass flowmeter 25 is used for measuring the cooling liquid flow, and the mass flowmeter is a high-precision mass flowmeter. The cooling liquid valve 29 adjusts the cooling liquid flow within the measuring range of the mass flowmeter. The constant temperature liquid bath 26 is used to maintain the constant temperature of the discharged cooling liquid. The temperature and flow of the cooling liquid can be controlled by setting the parameters of the constant liquid bath 26, the high-pressure pump 27 and the cooling liquid valve 29.

In the embodiment, a temperature range of the cooling liquid discharged from the constant temperature liquid bath 26 ranges from 5° C. to 300° C.

In the embodiment, the periphery of the high-temperature oscillating heat pipe 21 and the cooling liquid block 22 is wrapped with an thermal insulation layer to ensure that the heat of the condenser 32 of the high-temperature oscillating heat pipe 21 is transferred to the cooling liquid and the heat transferred by the high-temperature oscillating heat pipe 21 can be accurately measured; the material of the thermal insulation layer is the high-temperature resistance thermal insulation material. Four thermocouples are arranged inside and outside the thermal insulation layer respectively. The thermocouple is K-type thermocouple with high-temperature resistance ceramic Nextel sheath. The average temperature of the inside and outside the thermal insulation layer is measured through the readings of the thermocouples inside and outside the thermal insulation layer to calculate heat leakage.

In the embodiment, the liquid filling port tee-junction 23 and the liquid outlet tee junction 24 are both connected with RTD temperature sensors, with the model of PT 100, inserting into the central position of cooling liquid pipeline.

In the embodiment, the high-temperature furnace 20 is used to heat the high-temperature oscillating heat pipe 21 and is a sealed box structure. The top of the high-temperature furnace is provided with an upper cover of furnace chamber having a stepped hole 35. The high-temperature oscillating heat pipe 21 inserts into the high-temperature heating furnace 20 through the middle through hole of the stepped hole 35, and the adiabatic section 33 is wrapped with high-temperature resistance thermal insulation material and is vertically installed in the middle through hole. The upper cover of furnace chamber is arranged on the top of the high-temperature heat furnace 21, and heating rods are installed on the front, rear, left and right sides of the high-temperature heating furnace, to heat the high-temperature oscillating heat pipe 21 evenly. There is a side gap formed between the stepped hole 35 and the vertically installed high-temperature oscillating heat pipe 21, which is sealed by filling high-temperature resistance thermal insulation material through the stepped hole 35, thus the structure can be more stable and avoid falling of the thermal insulation material caused by the vertical hole. A flange plate is welded at the central position of both sides of the body of the high-temperature heating furnace 20. An angle adjusting device composed of gear transmission mechanisms is installed on the flange plate to adjust the overall inclination angle of the high-temperature heating furnace 20, thereby adjust the inclination angle of the high-temperature oscillating heat pipe 21, wherein the inclination angle ranges from 0 to 180°. The heating temperature, the heating speed, the input power and the inclination angle of the high-temperature oscillating heat pipe 21 can be controlled and adjusted by adjusting the parameter of the high-temperature heating furnace 20. By adjusting the heating program of the high-temperature heating furnace 20, the multi-stage heating process parameters can be set, the heating speed and the target furnace temperature can be adjusted and keep the temperature, and the input power is kept constant wherein the high-temperature oscillating heat pipe 21 works stably.

In the embodiment, the evaporator 34, the adiabatic section 33 and the condenser 32 of the high-temperature oscillating heat pipe 21 are respectively provided with at least one thermocouple, and a transverse tube at the upper part of the condenser 32 of the high-temperature oscillating heat pipe 21 is provided with at least one thermocouple. The thermocouples provided on the high-temperature oscillating heat pipe 21 are K-type thermocouple with high-temperature resistance ceramic Nextel sheath, and are used to detect the temperature changes of the evaporator 34 and the condensing section 32 of the high-temperature oscillating heat pipe 21, to get the temperature curves and the thermal resistance of the high-temperature oscillating heat pipe, thereby study the heat transfer performance of the high-temperature oscillating heat pipe 21. The temperatures of the evaporator 34 and the condenser 32 can be measured by the thermocouple readings of the evaporator 34 and the condenser 32, and the average temperatures of the evaporator 34 and the condenser 32 can be calculated by averaging the readings of a plurality of thermocouples.

Embodiment 3

Figure 5:
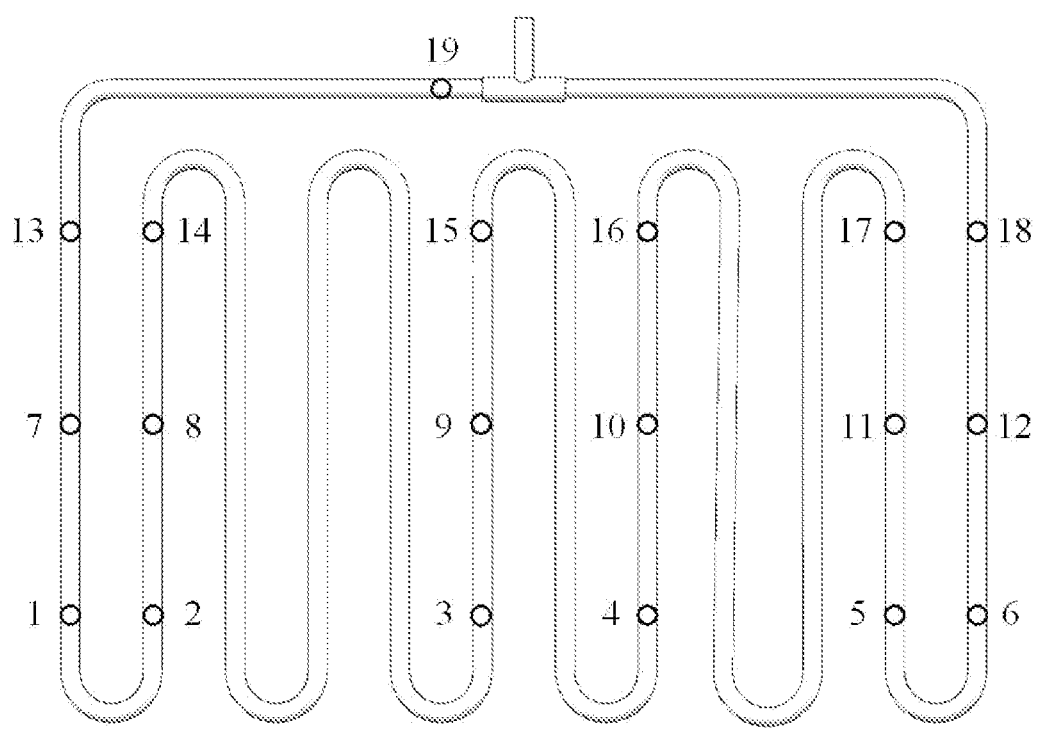
FIG. 5 is a distribution diagram of the installation positions of the thermocouples on the high-temperature oscillating heat pipe of the present disclosure.

In the embodiment, a high-temperature oscillating heat pipe 21 with an inner diameter of 6 mm, a wall thickness of 1 mm and a pipe material of stainless steel 310s is selected for the test. The volume filling ratio of the working fluid in the high-temperature oscillating heat pipe 21 is 45%, and the working fluid is sodium-potassium alloy in which the mass fraction of potassium is 75%. In the embodiment, a distribution diagram of the installation position of the thermocouples on the high-temperature oscillating heat pipe 21 is as shown in FIG. 5, and nineteen thermocouples are arranged on the high-temperature oscillating heat pipe 21. Thermocouple No. 19 is arranged on the transverse pipeline at the tee junction liquid filling port 30 of the stainless steel tube array 31. The evaporator 34, the adiabatic section 33 and the condenser 32 of the two adjacent tubes of the first elbow on the left are respectively provided with thermocouple No. 1 and thermocouple No. 2, thermocouple No. 7 and thermocouple No. 8, and thermocouple No. 13 and thermocouple No. 14. The evaporator 34, the adiabatic section 33 and the condenser 32 of the two adjacent tubes of the first elbow on the right are respectively provided with thermocouple No. 5 and thermocouple No. 6, thermocouple No. 11 and thermocouple No. 12, and thermocouple No. 17 and thermocouple No. 18. For the elbows in the middle, one tube on each of the two selected elbows is provided with thermocouples, and the evaporator 34, the adiabatic section 33 and the condenser 32 of the two tubes are respectively provided with thermocouple No. 3 and thermocouple No. 4, thermocouple No. 9 and thermocouple No. 10, and thermocouple No. 15 and thermocouple No. 16. The above thermocouples are all K-type thermocouples with high-temperature resistant ceramic Nextel sheath.

The working process is as follows:

1. First, the adiabatic section 33 of the high-temperature oscillating heat pipe 21 is fixed in the stepped hole 35 of the upper cover of furnace chamber of the high-temperature heating furnace 20 and the length of the evaporator 34 of the high-temperature oscillating heat pipe 21 in the high-temperature furnace 20 is adjusted, then the side gap formed between the stepped hole 35 and the installed high-temperature oscillating heat pipe 21 is sealed by filling high-temperature resistance thermal insulation material. The high-temperature heating furnace 20 is adjusted to a certain inclination angle after the adiabatic section 33 of the high-temperature oscillating heat pipe 21 is fixed. The inclination angle in the embodiment is 90°. Then, the high-temperature oscillating heat pipe 21 and the cooling liquid block 22 are integrally wrapped in multiple layers with high-temperature resistance thermal insulation material, and all devices in the testing system are connected.

2. The high-pressure pump 27 is started to circulate the cooling liquid. The cooling liquid flow is adjusted by adjusting the opening of the cooling liquid valve 29 and reading the date of mass flowmeter 25, to make the cooling liquid flow reach the preset value and stabilize for 10 minutes. The cooling liquid is filtered through the filter 28 to remove impurities.

3. The constant temperature liquid bath 26 is started to adjust the cooling liquid temperature to make the cooling liquid temperature reach the preset temperature of 58° C., providing a stable cooling environments for the high-temperature oscillating heat pipe.

4. The high-temperature heating furnace 20 is adjusted to the low-power heating state for warming-up. In the low-temperature state, the excessive heating speed of the high-temperature heating furnace 20 is easy to damage the globar. During warming-up, the thermocouples, the RTD temperature sensors and the measurement and control system are debugged to ensure the accuracy of data. When the warming-up of high-temperature heating furnace 20 is completed, proceed to the next step.

5. The input power of the high-temperature furnace 20 is increased to adjust the target temperature of the high-temperature heating furnace 20 to 850° C. for heating up. After the temperature in the high-temperature heating furnace 20 reaching 850° C., the temperature is maintained for 20 minutes; during this process, the input power of the high-temperature oscillating heat pipe 21 remains constant. After the data is recorded, proceed to the next step.

6. The target temperature of the high-temperature heating furnace 20 is adjusted to 900° C. for heating up. After the temperature in the high-temperature heating furnace 20 reaching 900° C., the temperature is maintained for 20 minutes; during this process, the input power of the high-temperature oscillating heat pipe 21 remains constant. After the data is recorded, proceed to the next step. Repeat the above heating process to heat up the temperature in the high-temperature heating furnace 20 to 950° C., 1000° C., 1050° C. and 1100° C. respectively. The heat transfer performance of the high-temperature oscillating heat pipe 21 under different input power is tested. Record the testing data and proceed to the next step.

7. The high-temperature heating furnace 20 is closed. The temperature of the constant temperature liquid bath 26 is turned down to enter the cooling process. When the cooling process is over, the test is over.

8. The input power of the high-temperature oscillating heat pipe 21 is calculated. The input power of the high-temperature oscillating heat pipe conforms to the following equation:

$$Q_e = C_p q_m \Delta T + q;$$

$$\Delta T = T_1 - T_2;$$

wherein, $Q_e$ represents the input power of the high-temperature oscillating heat pipe, with the unit of W; q represents the heat leakage, with the unit of W; $q_m$ represents a mass flow of cooling water measured by the mass flowmeter, with the unit of kg/s; $T_1$ represents the measured temperature of the RTD temperature sensor at the liquid outlet tee-junction, with the unit of ° C.; $T_2$ represents the measured temperature of the RTD temperature sensor at the liquid filling port tee-junction, with the unit of ° C.; $\Delta T$ represents the temperature difference at the liquid filling port and outlet, with the unit of ° C.; $C_p$ represents the specific heat capacity of the water at the operating temperature, with the unit of J/(kg·K); and $(T_1+T_2)/2$ represents the operating temperature.

9. The heat leakage is calculated.

The heat leakage is obtained by measuring the average temperatures inside and outside the thermal insulation layer by the readings of the thermocouples arranged inside and outside the thermal insulation layer, conforming to the following equation:

$$q = \frac{kA\Delta T_l}{L};$$

wherein, q represents the heat leakage, with the unit of W; k is represents the thermal conductivity of the thermal insulation layer material, with the unit of W/(m·k); A represents the area of the thermal insulation layer, with the unit of m²; $\Delta T_l$ represents the temperature difference between inside and outside the thermal insulation layer, with the unit of ° C.; and L represents the thickness of the thermal insulation layer, with the unit of m.

10. The heating resistance of the oscillating heat pipe is calculated, conforming to the following formula:

$$R = \frac{T_e - T_c}{Q_e};$$

wherein, R represents the thermal resistance of the high-temperature oscillating heat pipe, with the unit of K/W; $T_e$ represents the average temperature of the evaporator during stable operation of the high-temperature oscillating heat pipe, with the unit of ° C.; $T_c$ represents an average temperature of the condenser during stable operation of the high-temperature oscillating heat pipe, with the unit of ° C.; and $Q_e$ represents the input power of the high-temperature oscillating heat pipe, with the unit of W.

Figure 6:
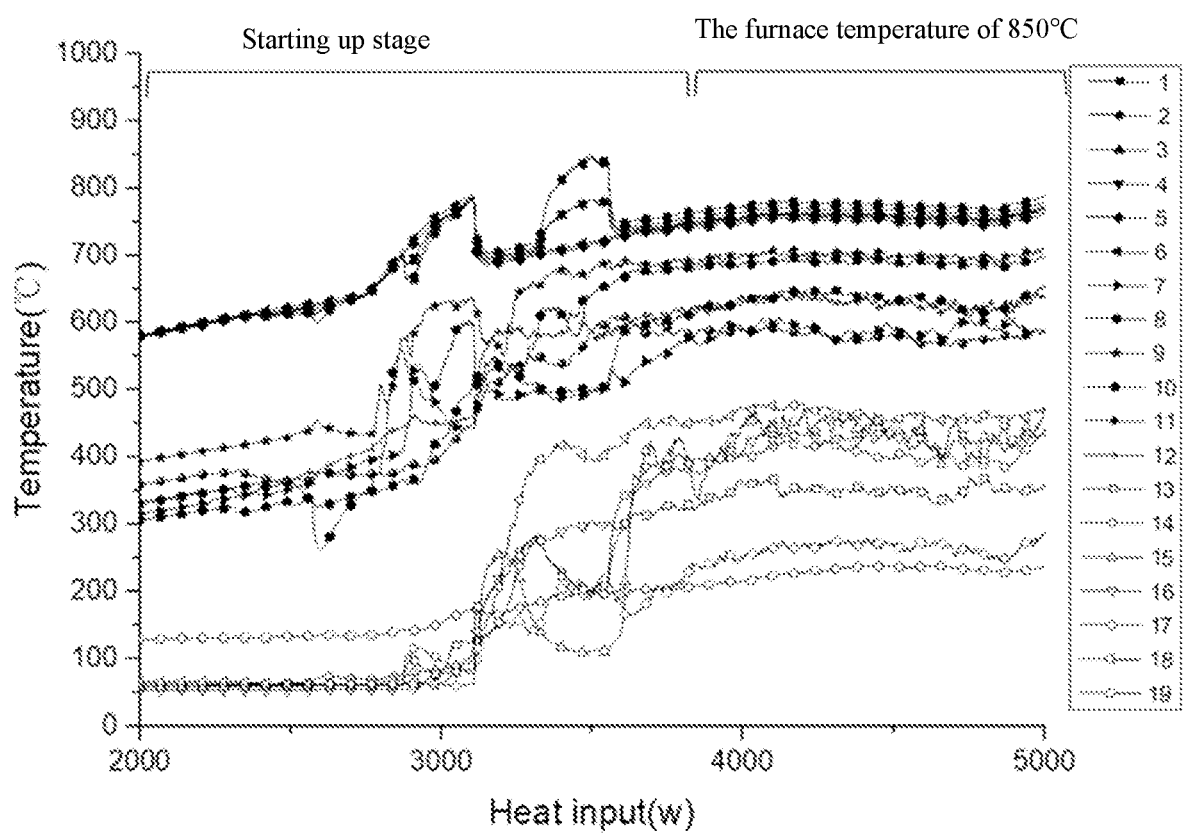
FIG. 6 is temperature curves when the high-temperature oscillating heat pipe is started and the furnace temperature of the high-heating furnace is 850° C. of the present disclosure.

FIG. 6 is the temperature curves when the high-temperature oscillating heat pipe 21 is started and the furnace temperature of the high-temperature heating furnace 20 is 850° C. As can be seen from FIG. 6, the high-temperature heating furnace 20 finishes warming-up at 2700 seconds and starts the heating stage, and the temperature rising speed is accelerated. When the temperature of the evaporator 34 reaches 790° C., the temperatures of the evaporator 34 and the adiabatic section 33 decrease sharply and the temperature of the condenser 32 rises sharply, and the high-temperature oscillating heat pipe 21 is started. At this time, the temperature of the high-temperature heating furnace 20 has not reached the preset temperature of 850° C., and the input power of the heating furnace is in the rising stage. At this time, the heating input of the high-temperature oscillating heat pipe 21 cannot maintain a stable oscillating movement. At 3300 seconds, some elbows of the high-temperature oscillating heat pipe 21 stop working, and the temperatures of thermocouple No. 1, thermocouple No. 2, thermocouple No. 3 and thermocouple No. 4 rise and temperatures of thermocouple No. 13, thermocouple No. 14, thermocouple No. 15 and thermocouple No. 16 drop, indicating that the pulsation of the tube appears weakened. The temperatures of thermocouple No. 5 and thermocouple No. 6 are stable, indicating that the corresponding cold end temperature has no sharp change and the two tubes work normally. With the continuous temperature rise of the heating furnace, the high-temperature oscillating heat pipe 21 is started again and reaches the preset temperature at 3900 seconds, and the high-temperature oscillating heat pipe 21 begins to work stably.

Figure 7:
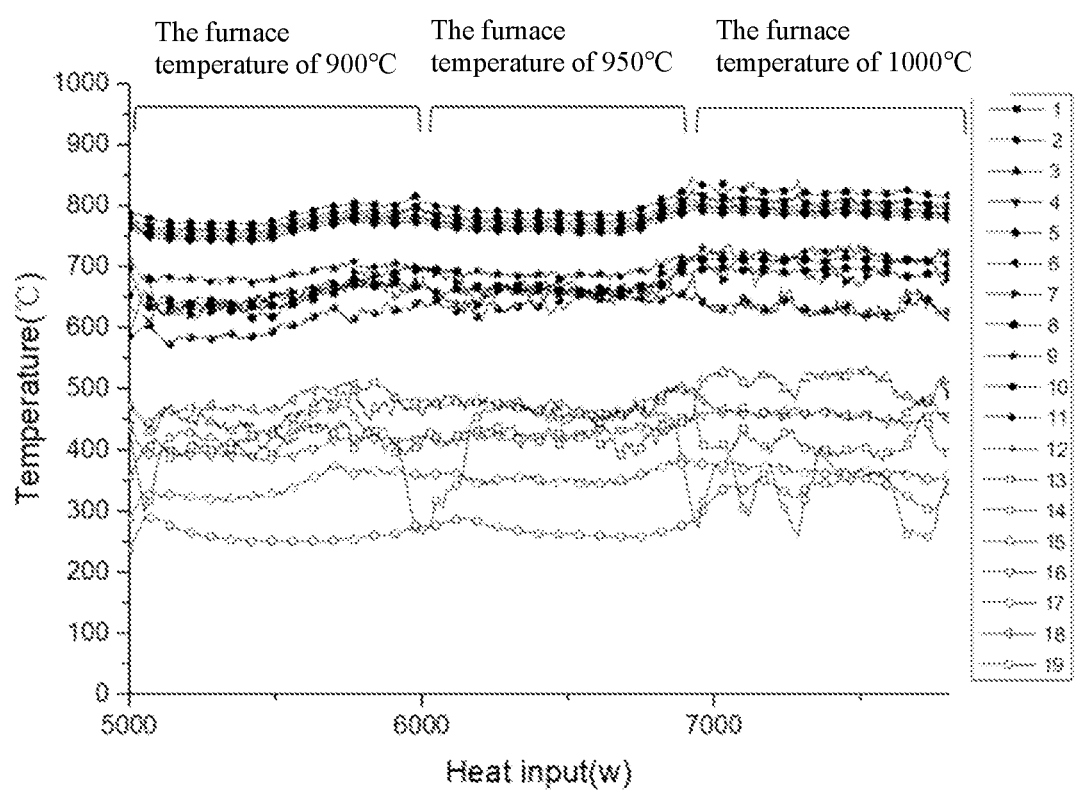
FIG. 7 is temperature curves when the furnace temperature of the high-temperature heating furnace is 900° C., 950° C. and 1000° C. respectively of the present disclosure.

FIG. 7 is the temperature curves when the furnace temperature of the high-temperature heating furnace 20 is 900° C., 950° C. and 1000° C. respectively. As can be seen from FIG. 7, when the furnace temperature of high-temperature heating furnace 20 is 900° C. and 950° C., the high-temperature oscillating heat pipe 21 works stably, and the stratification of the adiabatic section 33 is small. At this time, the temperature of the evaporator 34 increases with the increase of the furnace temperature while the temperature of the condenser 32 increases, the temperature difference between the cold and hot ends decreases, the heating input increases and the thermal resistance decreases. When the stratification of the condenser 32 of the first elbow on the left weakens, the condenser 32 of the first elbow on the right still has stratification. The temperature difference between thermocouple No. 17 and thermocouple No. 18 is large, because there will be a single elbow heat transfer when the high-temperature oscillating heat pipe 21 works stably; and the temperature of thermocouple No. 19 is stable. When the furnace temperature of the high-temperature heating furnace 20 is 1000° C., the temperature of the evaporator 34 fluctuates and the adiabatic section 33 is stratified; the temperatures of thermocouple No. 13 and thermocouple No. 14 of the first elbow on the left fluctuate violently and show the opposite change trend; the temperature of thermocouple No. 19 rises rapidly, at this time, the pulsation is violent and trends to circulate.

Figure 8:
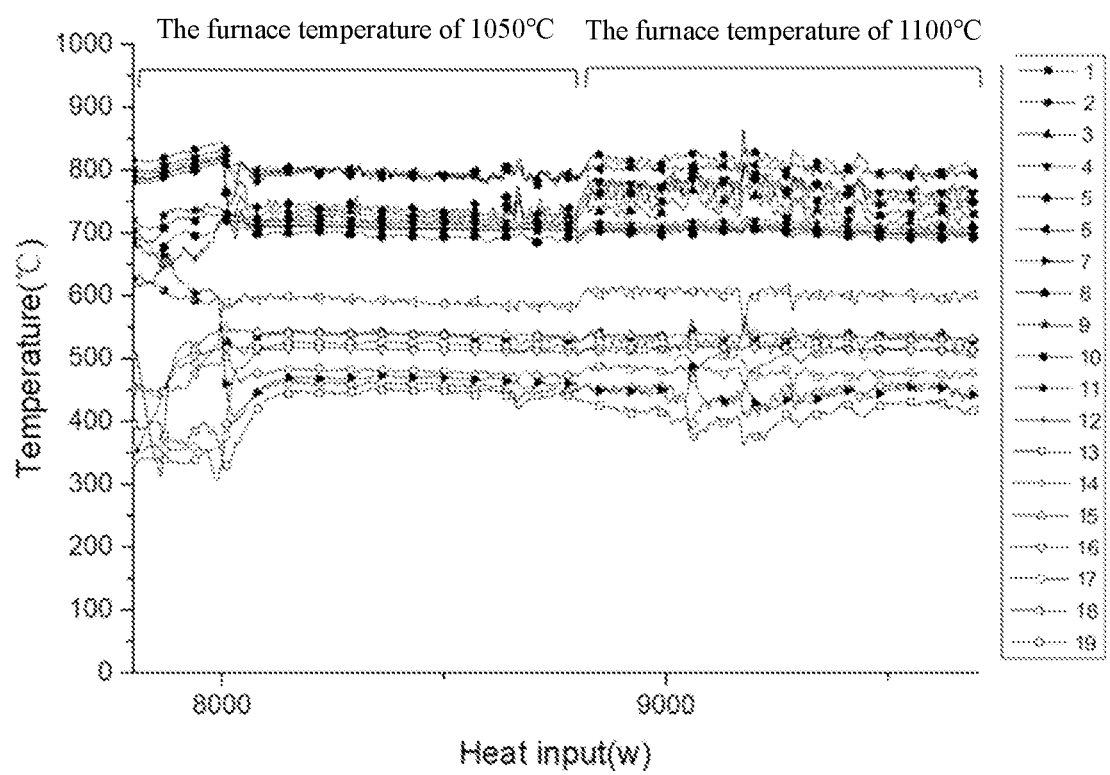
FIG. 8 is temperature curves when the furnace temperature of the high-temperature heating furnace is 1050° C. and 1100° C. respectively of the present disclosure.

FIG. 8 is the temperature curves when the temperature of the high-temperature heating furnace is 1050° C. and 1100° C. respectively. As can be seen from FIG. 8, when the temperature of high temperature furnace 20 is 1050° C., the temperatures of thermocouple No. 7 and thermocouple No. 11 drop, and the temperatures of thermocouple No. 8 and thermocouple No. 12 rise rapidly, and the temperatures of thermocouple No. 9 and thermocouple No. 10 continue to maintain high temperature, and the temperatures of thermocouple No. 8 and thermocouple No. 12 are greater than those of thermocouple No. 7 and thermocouple No. 11, at the same time, the temperature of thermocouple No. 19 rises fast; the adiabatic section 33 stratified obviously, and the temperature of the corresponding condenser 32 has the same change trend, forming a good stable circulation state, thereby enhancing the heat transfer effect. When the temperature of the high-temperature furnace 20 is 1100° C., the temperature of each thermocouple appears fluctuation and the temperature rises compared with that of the temperature of 1050° C., and the circulation state also fluctuates.

Figure 9:
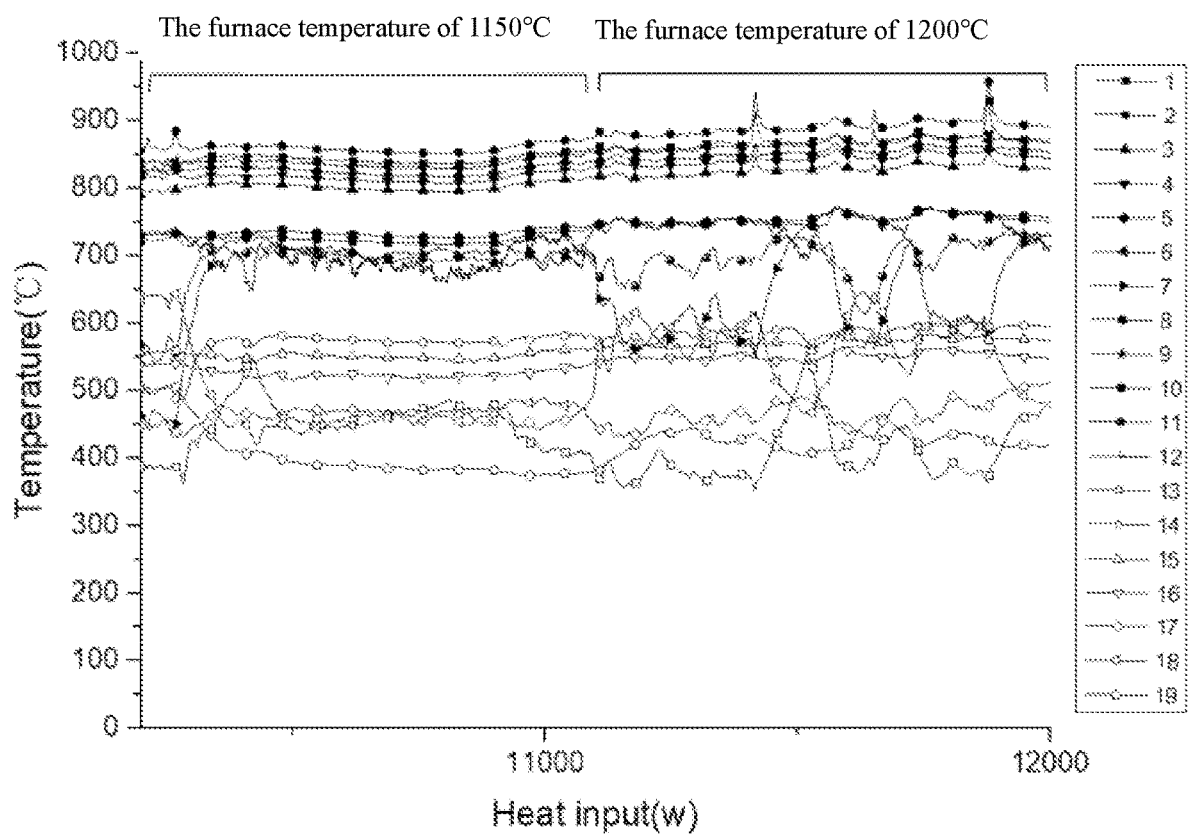
FIG. 9 is temperature curves when the furnace temperature of the high-temperature heating furnace is 1150° C. and 1200° C. respectively of the present disclosure.

FIG. 9 is the temperature curves when the temperature of the high-temperature heating furnace is 1150° C. and 1200° C. respectively. As can be seen from FIG. 9, when the temperature of the high-temperature heating furnace 20 is 1150° C., the temperatures of thermocouple No. 7 and thermocouple No. 11 increase rapidly, and the temperature of thermocouple No. 18 decreases rapidly, and the temperatures of thermocouple No. 13 and thermocouple No. 14 increase, and the temperature of thermocouple No. 19 decreases rapidly; the temperature fluctuation of the evaporator 34 disappears, and then the working state tends to be stable. At this time, the one-way cycle disappears and the pulsation state is restored again. When the temperature of the high-temperature heating furnace 20 is 1200° C., the temperatures of thermocouple No. 7 and thermocouple No. 11 fluctuate violently, and the temperature of thermocouple No. 18 rises; the high-temperature oscillating heat pipe 21 works unstable and the performance deteriorates.

Figure 10:
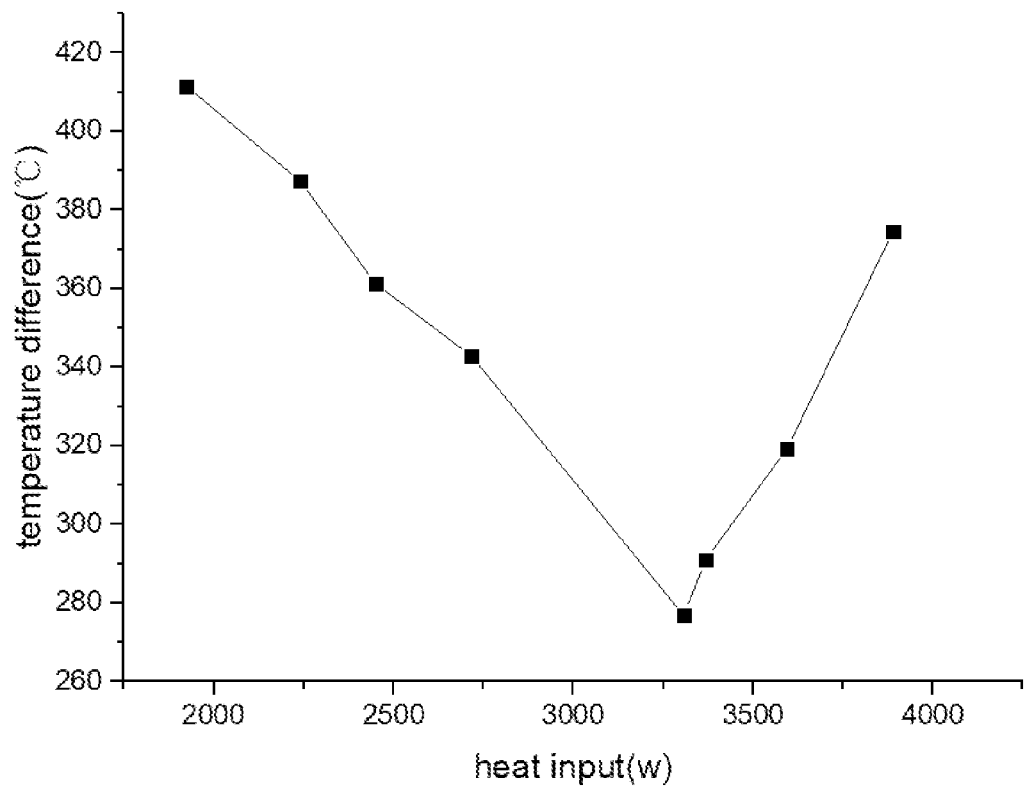
FIG. 10 is a curve of the temperature difference between the cold and hot ends of the high-temperature oscillating heat pipe changing with the power.

FIG. 10 is a curve of temperature difference between the cold and hot ends of the high-temperature oscillating heat pipe changing with the power. As can be seen from FIG. 10, the temperature difference between the cold and hot ends of the high-temperature oscillating heat pipe 21 first decreases then increases with the increase of the input power. The temperature difference is the minimum when the input power of the high-temperature oscillating heat pipe 21 is 3306.4 W (the temperature is 1050° C.).

Figure 11:
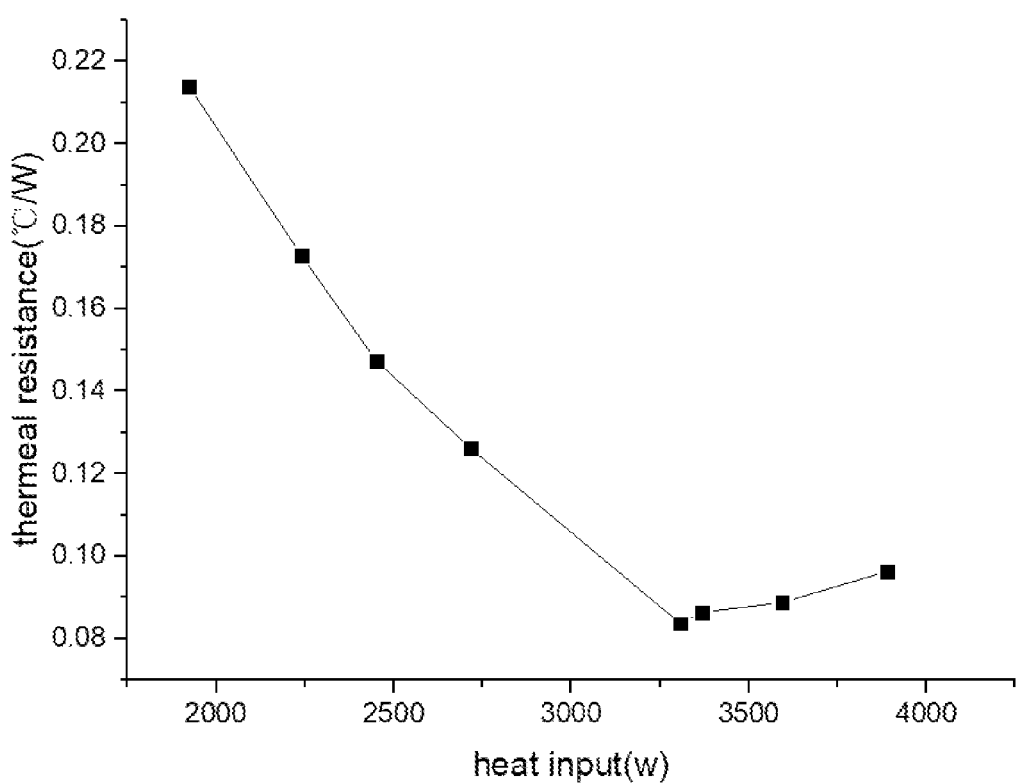
FIG. 11 is a curve of the heat resistance of the high-temperature oscillating heat pipe changing with the input power.

FIG. 11 is a curve of the thermal resistance of the high-temperature oscillating heat pipe 21 changing with the power. As can be seen from FIG. 11, the thermal resistance of the high-temperature oscillating heat pipe 21 first decreases then increases with the increase of the input power. The temperature difference is the minimum when the input power of the high-temperature oscillating heat pipe 21 is 3306.4 W (the temperature is 1050° C.).

As can be seen from FIGS. 6 to 9, the high-temperature oscillating heat pipe 21 in the embodiment has the ability to work at high temperature environments exceeding 500° C. It can be seen from FIGS. 10 and 11 that the smaller the thermal resistance of the high-temperature oscillating heat pipe 21, the better the performance.

As can be seen from FIGS. 6 to 11, the testing data of the high-temperature oscillating heat pipe 21 under different working conditions can be accurately measured by using the whole set of the testing system, thereby the testing system in the embodiment meets the testing requirements for the high-temperature oscillating heat pipe 21 under the high-temperature environments.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A liquid metal high-temperature oscillating heat pipe, comprising a tee-junction liquid filling port and a stainless steel tube array integrated by an evaporator, an adiabatic section and a condenser,
wherein two ports in a horizontal direction of the tee-junction liquid filling port are connected to two ports of the stainless steel tube array,
a working fluid in the stainless steel tube array is a liquid form of one or more metal selected from sodium-potassium alloy, metal sodium, metal potassium, metal cesium, and metal rubidium, wherein a mass fraction of potassium in the sodium-potassium alloy ranges from 25% to 75%,
wherein the high-temperature oscillating heat pipe is made of stainless steel, nickel base alloy, or Inconel nickel base alloy, and has a wall thickness of 0.5 mm to 3 mm, and has an inner diameter De is:

$$D_e < D = \left\{ \frac{4 p_g q}{u \pi h_c \left[ \frac{\Phi}{\varphi} \rho_{L,0} - \rho_{L,av} \right]} \right\}^{\frac{1}{2}},$$

wherein D represents a startup critical tube diameter of the oscillating heat pipe, having a unit of m; $\Phi$ represents a filling ratio, having a unit of %; $\varphi$ represents a percentage of the working fluid to a total pipe volume after applying input power, having a unit of %; $\rho_{L,0}$ represents a density of the working fluid at an operating temperature before applying input power, having a unit of kg/m³; $\rho_{L,av}$ represents an average density of the working fluid after applying input power, having a unit of kg/m³, u represents a rising speed of a bubble relative to the working fluid, having a unit of m/s; $h_c$ represents latent heat of vaporization of the working fluid at a cold end temperature, having a unit of J/kg; q represents input power, having a unit of J/s; and $p_g$ represents latent heat ratio, having a unit of %.

2. The liquid metal high-temperature oscillating heat pipe according to claim 1, wherein the filling ratio of the high-temperature oscillating heat pipe ranges from 10% to 90%.

3. A system for measuring heat transfer performance of the high-temperature oscillating heat pipe of claim 1, comprising a high-temperature heating furnace connected to the high-temperature oscillating heat pipe, a cooling liquid block, a high-pressure pump, a constant temperature liquid bath, a mass flowmeter, a filter, a cooling liquid valve, and a measurement and control system in signal connection with the aforementioned devices,
wherein the constant temperature liquid bath is connected with an inlet of the high-pressure pump, an outlet of the high-pressure pump is connected with an inlet of the filter, an outlet of the filter is connected with an inlet of the cooling liquid valve, an outlet of the cooling liquid valve is connected with an inlet the cooling liquid block through a set liquid filling port tee-junction, an outlet of the cooling liquid block is connected with an inlet of the mass flowmeter through a set liquid outlet tee-junction, an outlet of the mass flowmeter is connected with the constant temperature liquid bath, thereby forming a loop,
wherein the cooling liquid from the constant temperature liquid bath is circulated in the loop by the high-pressure pump,
wherein an outer front side of the cooling liquid block is provided with channels that match an outer circumference of the high-temperature oscillating heat pipe, and the channels are connected with the condenser of the high-temperature oscillating heat pipe, and;
wherein the adiabatic section of the high-temperature oscillating heat pipe is connected with the high-temperature heating furnace, and the evaporator of the high-temperature oscillating heat pipe is arranged in the high-temperature heating furnace.

4. The system according to claim 3, wherein a temperature of the cooling liquid from the constant temperature liquid bath is 5° C. to 300° C.

5. The system according to claim 3, wherein the circumference of the high-temperature oscillating heat pipe and the cooling liquid block is are wrapped with an thermal insulation layer, and at least four thermocouples are arranged inside and outside the thermal insulation layer to measure the temperature of the inner and outer walls of the thermal insulation layer.

6. The system according to claim 3, wherein the liquid filling port tee-junction and the liquid outlet tee-junction are both connected with RTD temperature sensors inserting into a central position of cooling liquid pipeline.

7. The system according to claim 3, wherein the high-temperature furnace has a structure of a seal box, the top of which is provided with an upper cover of furnace chamber having a stepped hole, and a through hole in the middle of the stepped hole is connected with the high-temperature oscillating heat pipe, a side gap formed between the stepped hole and the high-temperature oscillating heat pipe perpendicular to the upper cover of furnace chamber is sealed by filling a high-temperature resistance thermal insulation material, a flange plate is welded at central positions of both sides of body of the high-temperature heating furnace, and an angle adjusting device composed of gear transmission mechanisms is installed on the flange plate to adjust the overall inclination angle of the high-temperature heating furnace, wherein a inclination angle ranges from 0 to 180°.

8. The system according to claim 3, wherein each of the evaporator, the adiabatic section, and the condenser of the high-temperature oscillating heat pipe is provided with at least one thermocouple, and a transverse tube at the upper part of the condenser of the high-temperature oscillating heat pipe is provided with at least one thermocouple for obtaining the temperature change of the high-temperature oscillating heat pipe.

9. A testing method for measuring heat transfer performance of the high-temperature oscillating heat pipe in the testing system of claim 3, comprising:
  starting the high-pressure pump to circulate the cooling liquid in the loop,
  adjusting cooling liquid flow by adjusting the opening of the cooling liquid valve;
  recording data shown in the mass flowmeter;
  starting the constant temperature liquid bath to adjust the cooling liquid temperature to provide stable a cooling environment for the high-temperature oscillating heat pipe;
  adjusting the high-temperature heating furnace to a low-power heating state for warming-up;
  controlling and adjusting heating temperature, heating speed, input power and inclination angle of the high-temperature oscillating heat pipe by adjusting parameters of the high-temperature heating furnace;
  setting multi-stage heating process parameters by adjusting a heating program of the high-temperature heating furnace;
  adjusting the heating speed and target temperature of the furnace and keeping warm, and
  ensuring constant heating input of the high-temperature oscillating heat pipe after stable operation and recording testing data;
  turning off the high-temperature heating furnace; and
  reducing the temperature of the constant temperature liquid bath.

10. The testing method according to claim 9, wherein the thermal resistance of the high-temperature oscillating heat pipe is $$R = \frac{\overline{T}_e - \overline{T}_c}{Q_e},$$

wherein R represents the thermal resistance of the high-temperature oscillating heat pipe, having a unit of K/W; $\overline{T}_e$ represents an average temperature of the evaporator during stable operation of the high-temperature oscillating heat pipe, having a unit of ° C.; $\overline{T}_c$ represents an average temperature of the condenser during stable operation of the high-temperature oscillating heat pipe, having a unit of ° C.; $Q_e$ represents the input power of the high-temperature oscillating heat pipe, having a unit of W;

wherein the input power of the high-temperature oscillating heat pipe is $$Q_e = C_p q_m \Delta T + q,$$

wherein $\Delta T = T_1 - T_2,$ wherein $Q_e$ represents the input power of the high-temperature oscillating heat pipe, having a unit of W; q represents the heat leakage, having a unit of W; $q_m$ represents a mass flow of cooling water measured by the mass flowmeter, having a unit of kg/s; $T_1$ represents the temperature measured by the RTD temperature sensor at the liquid outlet tee-junction, having a unit of ° C.; $T_2$ represents the temperature measured by the RTD temperature sensor at the liquid filling port tee-junction, having a unit of ° C.; $\Delta T$ represents a temperature difference at the liquid filling port and outlet, having a unit of ° C.; $C_p$ represents a specific heat capacity of the water at the operating temperature, having a unit of J/(kg·K); and $(T_1+T_2)/2$ is the operating temperature, having a unit of ° C.;

and the heat leakage is:

$$q = \frac{kA\Delta T_l}{L},$$

wherein q represents the heat leakage, having a unit of W; k is represents a thermal conductivity of the thermal insulation layer material, having a unit of W/(m·k); A represents an area of the thermal insulation layer, having a unit of m²; $\Delta T_l$ represents a temperature difference between inside and outside the thermal insulation layer, having a unit of ° C.; and L represents a thickness of the thermal insulation layer, having a unit of m.

* * * * *